Inventors
Fritz Krempel
Theodor Stöferle
by Michael S Striker
Atty

Inventor:

Nov. 18, 1969  F. KREMPEL ET AL  3,478,859
CONVEYING APPARATUS
Filed Oct. 30, 1967  8 Sheets-Sheet Inventor:

United States Patent Office 3,478,859
Patented Nov. 18, 1969

3,478,859
CONVEYING APPARATUS
Fritz Krempel, Metzingen-Neugreuth, and Theodor Stoferle, Ludwigsburg-Pflugfelden, Germany, assignors to Karl Huller GmbH, Ludwigsburg, Wurttemberg, Germany
Filed Oct. 30, 1967, Ser. No. 678,949
Int. Cl. B23q 7/00
U.S. Cl. 198—19                 15 Claims

ABSTRACT OF THE DISCLOSURE

A conveying apparatus for stepwise moving elements or work pieces between and exactly locating elements in a plurality of spaced working stations arranged along guide means of the conveying apparatus, in which a plurality of plates adapted to support the elements are guided by the guide means, in which the plates are stepwise moved by engaging members mounted on a reciprocable rod and brought in engagement with the plates during movement of the rod in one direction and disengaged from the plates during movement of the rod in the opposite direction, and in which the plates are engaged by positioning means in the respective positions to which they are moved by the engaging members to maintain the plates in fixed exact positions during return movement of the rod and while the engaging members are disengaged from the plates.

Background of the invention

The present invention relates to a conveying apparatus for stepwise moving elements between and exactly locating elements in a plurality of working stations arranged along an assembly line so that different operations may be performed successively on the elements by operating units respectively located at the working stations of the assembly line. Such conveying apparatus is known in the art and it may include at least one pair of spaced and oppositely arranged guide means, one of which defines the aforementioned assembly line, in which a plurality of transporting plates adapted to support the elements or workpieces are guided for movement therealong, and are stepwise moved by means of elongated transporting means extending along the guide means and provided with a plurality of spaced engaging members adapted to engage the transporting plates. The elongated transporting means are reciprocable in longitudinal direction and movable between an active position in which the engaging members respectively engage the plates and an inactive position in which the engaging means are out of engagement with the plates. The arrangement is made in such a manner that the elongated transporting means are longitudinally moved in one direction for a given distance equal to the spacing of the working stations on the assembly line while the engaging members thereon are in engagement with the plates so that the plates are simultaneously moved in the one direction over the given distance, while during return movement of the elongated transporting means the engaging means are disengaged from the plates. The aforementioned conveying apparatus includes also usually positioning means by means of which the plates are held arrested in the working positions to which they are brought by the transporting means while the latter returns to its starting position.

The positioning means of such conveying apparatus usually comprise at each of the working stations a positioning or locking mechanism in order to fix the simultaneously transported plates in predetermined positions along the assembly line with the greatest exactness. Such locking mechanism usually comprise locking or positioning members controlled by a fluid operated mechanism, which members may for instance have a conical shape and are moved into corresponding cavities of the plates in order to exactly position the latter.

Due to the great number of arresting mechanisms required by the positioning means known in the art, such conveying apparatus is very complicated and therefore expensive to manufacture, while the space requirements of such apparatus are also considerable.

It is an object of the present invention to provide for a conveying apparatus of the aforementioned kind which is considerably simpler in construction than the conveying apparatus known in the art.

It is a further object of the present invention to provide a conveying apparatus of the aforementioned kind in which especially the positioning means are of simple construction so that the space requirements for the apparatus, as well as the manufacturing costs thereof are reduced.

It is an additional object of the present invention to provide for a conveying apparatus of the aforementioned which due to its simple construction will operate trouble-free during an extended time.

Summary of the invention

With these objects in view the conveying apparatus according to the present invention for stepwise moving elements or workpieces between and exactly locating the elements in a plurality of positions or working stations mainly comprises support means, at least one pair of spaced oppositely arranged guide means, at least one of which defines an assembly line along which a plurality of operations may be successively performed on the workpieces, a plurality of spaced transporting plates adapted to support the elements or workpieces and being slidably guided by the guide means for movement therealong, elongated transporting means extending along the guide means and having a plurality of engaging members respectively adapted to engage the transporting plates. The elongated transporting means are mounted on the support means movable in longitudinal direction and movable between an active position in which the engaging members respectively engage the plates and an inactive position disengaged therefrom. The apparatus includes further moving means cooperating with the elongated transporting means for cyclically moving the latter between the active and the inactive position, reciprocating means cooperating with the elongated transporting means for reciprocating the latter in longitudinal direction for a given distance in sequence with the moving means so that during movement of the transporting means in one direction of reciprocation while the transporting means is in the active position, the transporting plates will be moved through the given distance in the one direction, elongated positioning means extending along the assembly line and including a plurality of locating means at least one for each plate on the assembly line, in which the positioning means are mounted on the support means immovably in longitudinal direction and movable between an active position in which the locating means engage the plate members for arresting the same in the position to which they are moved by the transporting means and an inactive position disengaged from the plates, and means cooperating with the positioning means for moving the latter between the positions thereof.

The elongated transporting means preferably comprise an elongated transporting rod mounted on the support means for reciprocating movement in longitudinal direction and turnable about its axis, and each of the engaging members is fixed to the rod projecting therefrom in direction transverse to the rod's axis, and each of the plates may be provided with a cutout in which the free end of the respective engaging member engages when the transporting means is in the active position.

Each of the locating means preferably comprise a pair of locating member spaced in direction of the elongation of the elongated positioning means from each other and adapted to cooperate in the active position of the locating means with correspondingly spaced surfaces on respective plates. Preferably, the locating members of each pair of locating members are spaced from each other a distance equal to the length of each plate so as to engage in the active position transverse end faces of the respective plate.

In a preferred arrangement the positioning means comprises an elongated positioning rod mounted on the support means turnably about its axis but immovably in axial direction and the locating members being fixed to the positioning rod projecting therefrom transverse to the axis of the latter. The transporting rod as well as the positioning rod are preferably arranged substantially parallel to each other and in a plane substantially parallel to the guide means.

In this arrangement the positioning means comprises therefore only a single control member which can be moved in a very simple way, for instance by means of cylinder and piston means between its active and its inactive position. By providing on the positioning rod a pair of arms or positioning members for each plate spaced from each other a distance corresponding to the length of the respective plate a very exact positioning of the plates may be obtained, since the arrangement can be made in such a manner that the positioning members will engage opposite transverse end faces of the respective plates substantially without clearance.

The conveying apparatus according to the present invention may be laid out in various different ways. For instance, it may include at least two assembly lines, formed by a pair of guide means arranged in a common plane parallel to each other. If more than two assembly lines have to be provided it is possible to arrange the same at a predetermined angle with respect to each other whereby the guide means thereof in their totality form an endless path. In both cases, a transporting rod and a positioning rod is provided for each of the guide means for the transport and positioning of the plates guided thereon.

According to the present invention it is also possible to provide for a conveying apparatus which includes at least two assembly lines and in which guide means are arranged in parallel planes adjacent to each other. In this case, the transporting plates are vertically arranged. By arranging the guide means for the transporting plates in parallel planes, it is also possible to provide for a conveying apparatus which has only a single assembly line. Such a construction will result when the two plates guides are arranged one above the other and in which the plates are guided in horizontal position. An especially advantageous construction for a conveying apparatus according to the present invention in which the guide means are arranged either side-by-side or one above the other, is obtained when in this case for both guide means only a single transporting rod and a single positioning rod is provided. In this case the rods are respectively provided with engaging members and positioning members arranged in such a manner that in the active as well as in the inactive position of the rods the members thereon will be respectively in engagement with transport plates on opposite guide means. Such a construction permits to move and to position the transporting plates which are guided on side-by-side or superimposed guide means with a single transporting rod and a single positioning rod.

The apparatus of the present invention preferably includes also transfer means for transferring a plate at one end of one guide means to the adjacent end of the other guide means and such transfer means preferably comprise gripping means having a pair of arms extending substantially parallel to and spaced from each other a distance substantially equal to the thickness of a plate so as to be adapted to engage a plate at opposite faces thereof, and the arms are mounted turnably about an axis substantially normal to the direction of movement of the plates so as to be movable between two end positions in one of which the gripping means is adapted to grip a plate at one end of one guide means and in the other of which the gripping means introduces the plate into the adjacent end of the other guide means in a position ready to be engaged by the corresponding engaging member of the transporting rod.

It is also an object of the present invention to provide a conveying apparatus of the aforementioned kind in which at least some of the positions to which the plates are stepwise moved along the guide means forming the assembly line, and preferably to opposite sides of this assembly line, working units are arranged adapted to perform operations on the workpieces moved by the transporting plates while the latter are arrested in fixed position.

According to the present invention, the operating movements of the operating units are controlled by cams mounted on a pair of shafts arranged on the support means beneath the assembly line parallel to each other and preferably driven by a common drive means, and in this arrangement additional cams are provided on at least one of the shafts, while transmission means in form of levers or the like are provided between the additional cams and the transporting rod as well as the positioning rod so as to reciprocate the transporting rod in longitudinal direction and to turn both rods about their axes in sequence to the movements performed by the operating members of the operating units. In such an arrangements the operating units as well as the transporting and the positioning rod are mechanically controlled and this control is accomplished with only two control shafts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Description of the preferred embodiment

Figure 1:
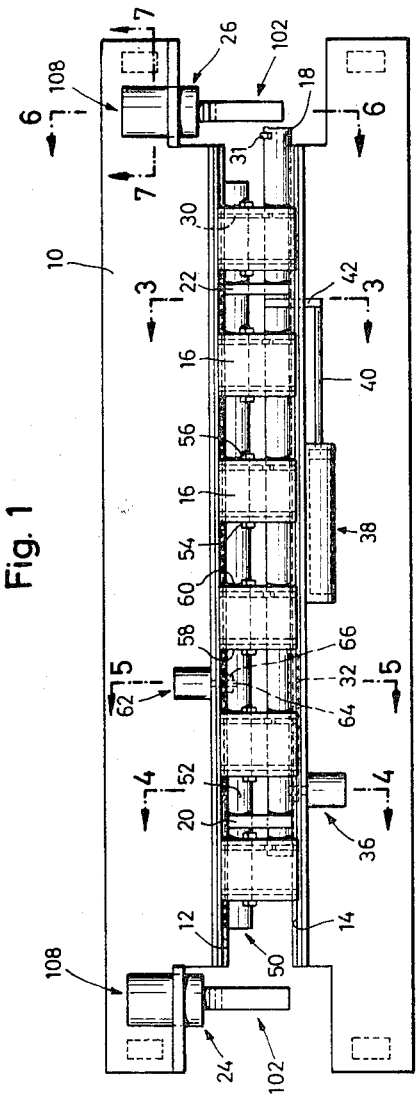
FIG. 1 is a top view of a conveying apparatus according to the present invention which is provided with only one assembly line.
Figure 2:
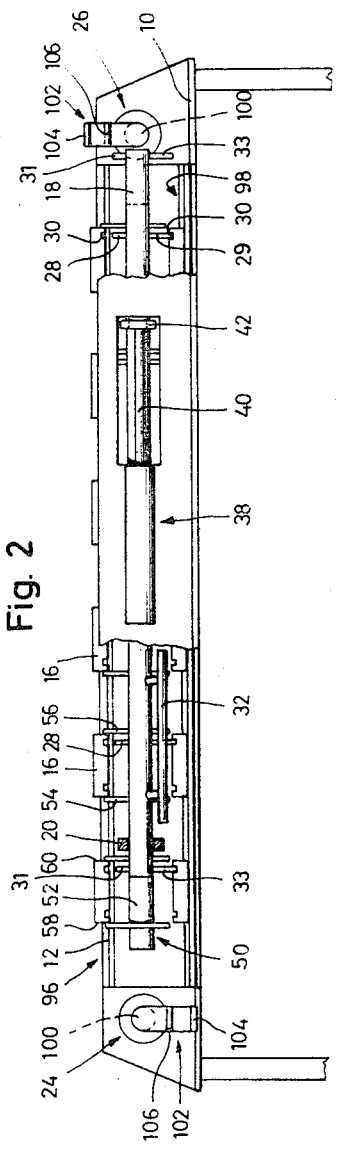
FIG. 2 is a front view of the apparatus shown in FIG. 1 with some parts broken away.
Figure 4:
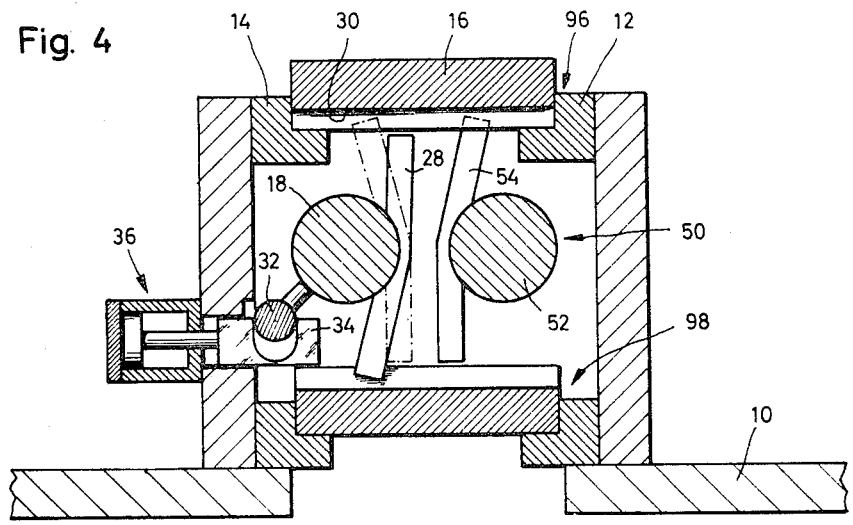
FIG. 4 is a section along the line 4—4 of FIG. 1, likewise drawn to an enlarged scale.

Referring now to the drawings, and more specifically to FIGS. 1 and 2 of the same, it will be seen that the conveying apparatus illustrated in these two figures includes a single assembly line. The apparatus comprises support means 10 in form of a frame forming an upper horizontally arranged table on which guide means extending in longitudinal direction of the table are provided which are constituted by two guide rails 12 and 14 arranged parallel and spaced from each other, on which a plurality of spaced transporting plates 16 are slidably guided arranged. The transporting plates 16 are held at predetermined distance from each other and stepwise moved along the guide means constituting an assembly line between a plurality of positions and held in each of the positions for a predetermined time. The transporting means for simultaneously and stepwise moving the transporting plates preferably include a transporting rod 18 which is mounted for reciprocating movement in axial direction and turnably about its axis in stationary bearings 20 and 22 carried by the support means. Transfer means 24 and 26 are respectively provided at the opposite ends of the guide rails 12 and 14, and the transfer means 26 are constructed and arranged in a manner as will be described later on in detail to grip the individual at the right ends of the guide rails 12 and 14, arriving transporting plates 16 and to transfer the plates to guide rails arranged beneath the guide rails 12 and 14 so that the plates may be transported on the lower rails in opposite direction. The transfer means 24 grips the plates as they arrive on the lower guide means and transfers the latter back again to the upper guide means. In order to uniformly and simultaneously transport the transporting plates 16, the transporting rod 18 is provided with a plurality of engaging members 28, one for each plate on the assembly line, which in this case projects transverse to the axis of the rod 18 to opposite sides of the latter. Each of the plates 16 is provided with a cutout or transverse groove 30 in which the respective free end of the engaging member may engage. The engagement and disengagement of the respective end of the engaging member 28 with the corresponding cutout or groove 30 is accomplished by turning the transporting rod 18 about its axis through a given angle. For this purpose turning means are provided which may include a rod 32 (FIG. 4) having a length at least equal to the stroke of the reciprocatably arranged rod 18 and being fixed thereto spaced and parallel to the rod as best shown in FIGS. 2 and 4. The member 32 is engaged by a forked element 34 which is connected to the piston rod of a fluid operated cylinder and piston means 36. In the position shown in FIG. 4 the lower ends of the engaging members 28 will be engaged in the grooves 30 of the plates moved along the lower guide means 98, whereas when pressure fluid is introduced to the left side of the piston, as viewed in FIG. 4, the forked member 34 will be moved toward the right so that the rod 18 will be turned in counterclockwise direction about its axis and the engaging members be brought to the position as shown in dash-dot lines in FIG. 4, whereby the upper ends of the engaging members 28 will engage in the grooves 30 of the plates guided on the upper guide means 96. The cylinder and piston means 36 and the elements cooperating therewith form therefore moving means for moving the transporting means constituted by the rod 18 and the engaging members 28 thereon between an active position in which the engaging members engage in the grooves 30 of the respective plate and an inactive position disengaged therefrom.

Figure 3:
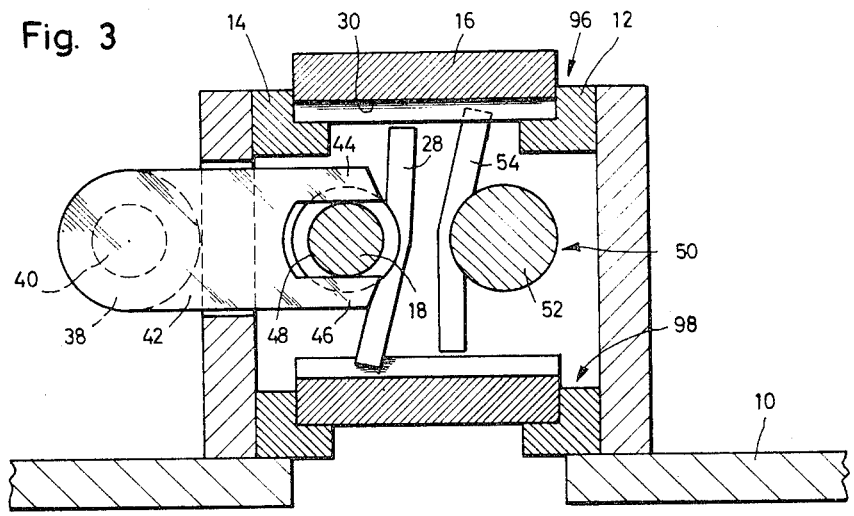
FIG. 3 is a section taken along the line 3—3 of FIG. 1 and drawn to an enlarged scale.

The means for reciprocating the rod 18 through a given distance in longitudinal direction may include fluid operated cylinder and piston means 38 (FIGS. 1 and 2), the piston rod 40 of which carries at its free end a fork-shaped member 42 which, with its two arms 44 and 46, engages in a peripheral groove 48 of the transporting rod 18 (FIG. 3).

Figure 5:
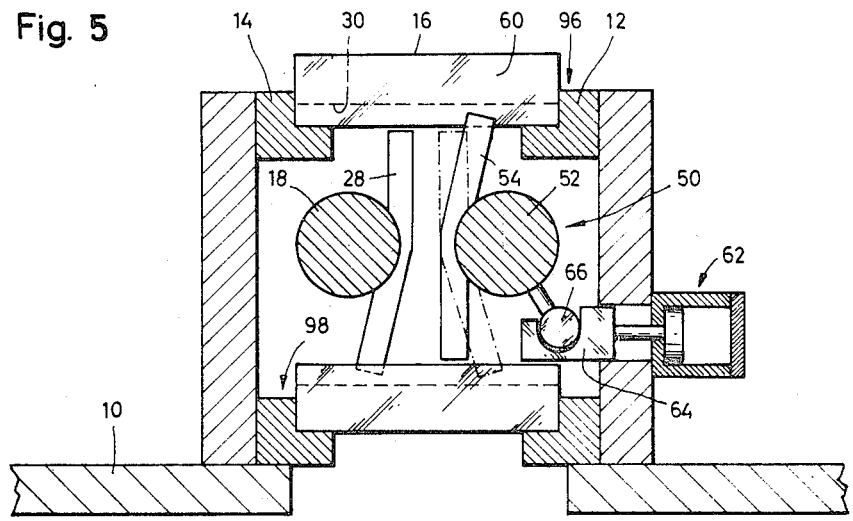
FIG. 5 is a section along the line 5—5 of FIG. 1, drawn to an enlarged scale.

The positioning means for exactly positioning and arresting the plates at the positions to which they are transported by the transporting means are designated with 50 and these positioning means comprise according to the present invention a positioning rod 52 extending spaced from and parallel to the transporting rod 18 and likewise mounted in the bearings 20 and 22 turnable about its axis, but axially immovable. In the preferred embodiment according to the present invention the positioning means include further a pair of locating members 54 for each plate and the locating members of each pair are fixed to the positioning rod spaced from each other a distance substantially equal to the length of each plate so as to engage in the active position thereof the end faces 58 and 60 of the respective plate, which extend normal to the direction of movement thereof, substantially without clearance. The positioning means constituted by the rod 52 and the locating members 54 thereon may be moved between an active position in which the locating members respectively engage opposite end faces of the respective plates and an inactive position disengaged therefrom by means as shown in FIG. 5 and including cylinder and piston means 62 having a piston rod connected to a fork-shaped member 64 which engages with the free end of a lever 66 fixed to and extending radially from the rod 52. By feeding pressure fluid respectively to opposite sides of the piston of the cylinder and piston means 62, the rod 52 will be turned through a given angle in the one or the opposite direction so that the members 54 and 56 may be brought into engagement with opposite end faces of the respective plates and be disengaged therefrom. The transporting plates are therefore stepwise transported and properly positioned by means of the two control rods 18 and 52 and the elements cooperating therewith.

The conveying apparatus as described above, which includes for each assembly line along which the plates are guided a transporting rod and a positioning rod, can be varied in many different ways and some possible modifications of the above described arrangement are illustrated in FIGS. 12–18.

Figure 12:
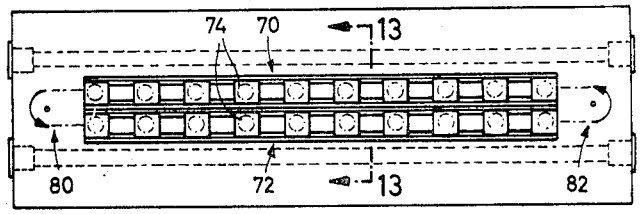
FIG. 12 is a schematic top view of a second embodiment in which a pair of assembly lines are arranged side-by-side in a common plane.
Figure 13:
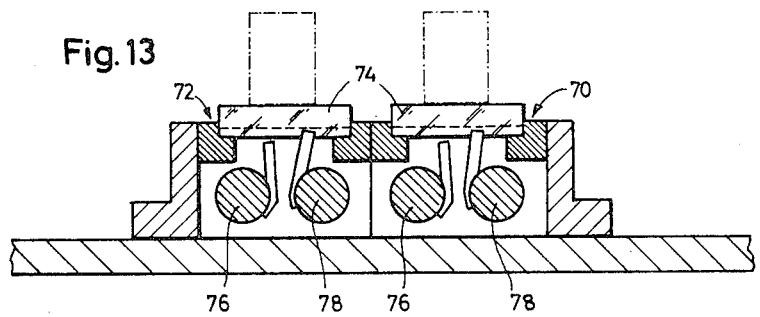
FIG. 13 is a cross section along the line 13—13 of FIG. 12 and drawn to a larger scale than the latter.
Figure 14:
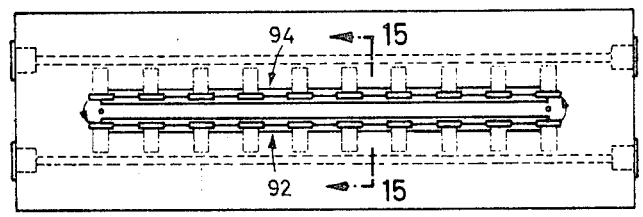
FIG. 14 is a schematic top view of a third embodiment according to the present invention provided with two adjacent assembly lines, the guides of which are arranged in parallel planes adjacent to each other and in which the transport plates are guided in a vertical position.
Figure 15:
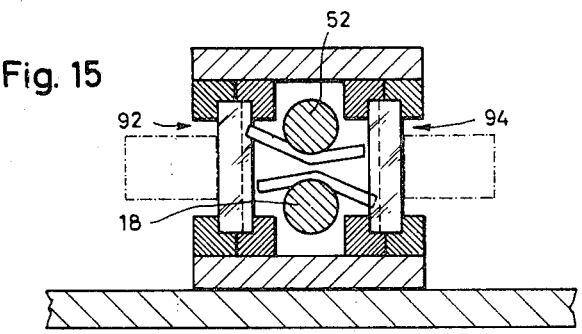
FIG. 15 is a section taken along the line 15—15 of FIG. 14 and drawn to a larger scale than the latter.

In the arrangement shown in FIGS. 12 and 13 there are two assembly lines 70 and 72 provided, which are arranged in a common plane adjacent to each other. In this arrangement, a transporting rod 76 and a positioning rod 78 is provided for each of the assembly lines 70 and 72 for moving and properly locating the transporting plates 74 thereon, and the engaging members fixed to the rod 76 as well as the locating members fixed to the rod 78 need project only to one side of the respective rod as clearly shown in FIG. 15. To transfer the transporting plates 74 from one end of one assembly line to the adjacent end of the other assembly line, transfer means 80 and 82 are provided, as schematically indicated in FIG. 12.

Figure 16:
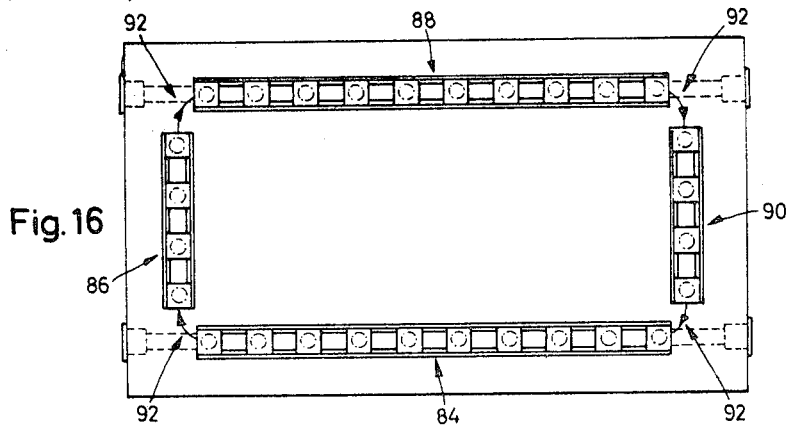
FIG. 16 is a schematic top view of a further embodiment in which four assembly lines are provided, the guide means of which are arranged in a common horizontal plane.
Figure 17:
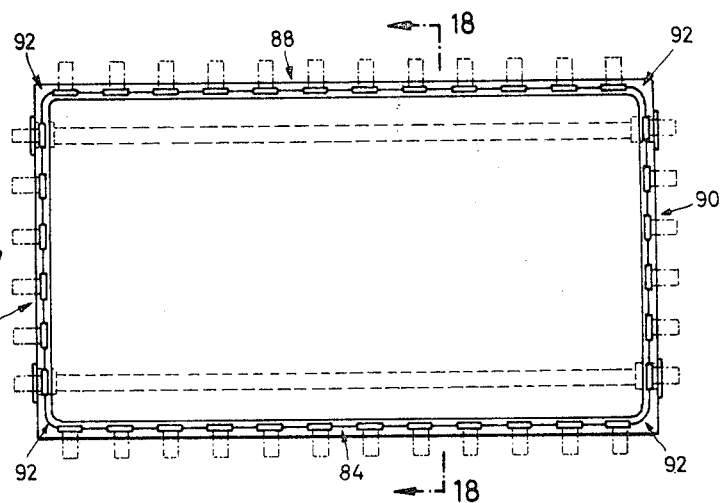
FIG. 17 is a schematic top view of an additional embodiment which is also provided with four assembly lines in which the transporting plates are however guided in vertical position.
Figure 18:
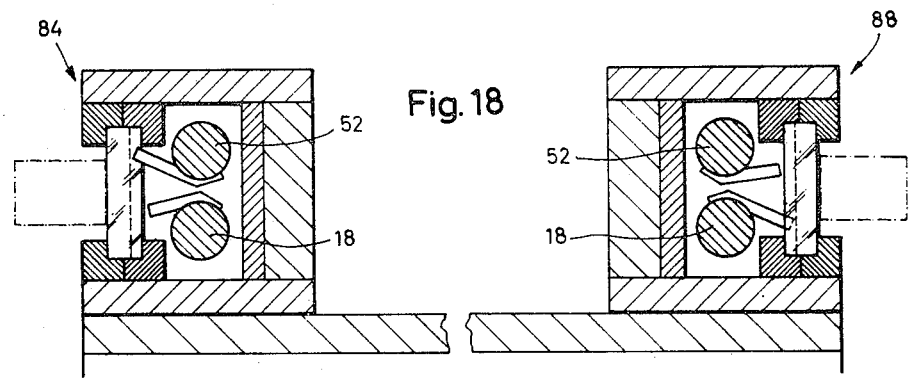
FIG. 18 is a section taken along the line 18—18 of FIG. 17 and drawn to a larger scale than the latter.

In the modification shown in FIGS. 16 and 17 there are four assembly lines 84, 86, 88 and 90 provided which are arranged respectively at right angles to each other whereby to transfer the transporting plates from one end of one assembly line to the adjacent end of the adjacent assembly line transfer means 92 are provided, as schematically shown in these figures. In the arrangement according to FIGS. 12, 13 and 16, the transporting plates are arranged in a common horizontal plane, whereas in the arrangement shown in FIGS. 14, 15, 17 and 18 the plates are arranged and transported in vertical position.

In the constructions according to the present invention in which a pair of guide means are provided which are arranged in two parallel planes adjacent each other, as in FIGS. 1 and 2, 14 and 15, respectively 19 and 20 the arrangement according to the present invention is made in such a way that a common transporting rod and a common positioning rod is provided to transport and properly position the transporting plates on both guide means. The rods 18 and 52 are in this case arranged parallel to each other in the space between the guide means 92, 94 (FIG. 14) respectively between the guide means 96, 98 (FIGS. 2 and 4) and these rods are respectively provided with engaging members and locating members fixed to the rod and projecting transverse to the rod axis to opposite sides of the respective rod. By corresponding turning of the rods about their axes, the engaging members and the locating members respectively provided thereon can be brought in active engagement with the transporting plates respectively located on the oppositely arranged guide means 92, 94 respectively 96, 98. The fluid operated control means which control the turning movement of the two rods are thereby operated in such a manner that when one of the rods is in its turned end positions in active engagement with the transporting plates on one guide means, the other rod will be in active engagement with the transporting plates on the opposite guide means (see especially FIGS. 4 and 5).

The function of the transporting rod in an arrangement as described above will now be described above will now be described in connection with FIGS. 8–11.

Figure 19:
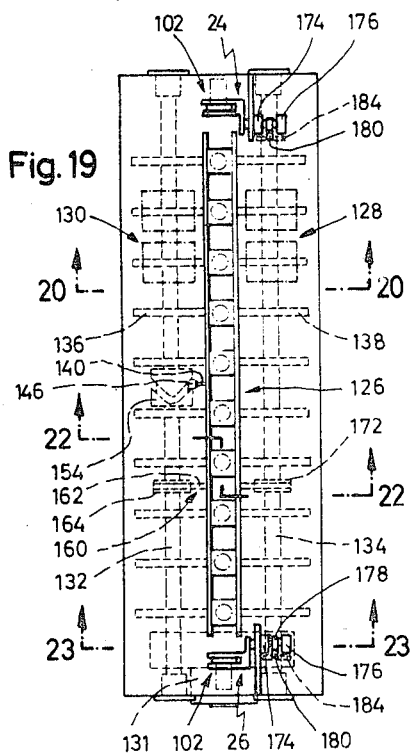
FIG. 19 is a schematic top view of an additional embodiment provided with only one assembly line along which at least at some of the positions to which the plates are stepwise transported and preferably at opposite sides of the assembly line, operating units are mounted indicated in dash-dot lines in FIG. 19.
Figure 20:
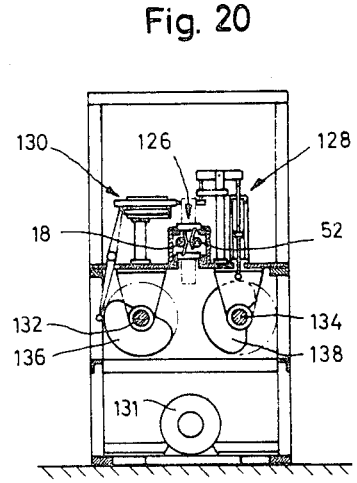
FIG. 20 is a cross section taken along the line 20—20 of FIG. 19.

The sequence of movements as shown in FIGS. 8–11 holds true for the arrangements shown in FIGS. 1, 2, respectively 14, 15 and also with respect to the construction according to FIGS. 19 and 20. For reason of simplification only eleven transporting plates are shown in FIGS. 8–11, whereby six plates are respectively shown in the one and five plates in the other of the pair of guide means. For each oppositely arranged pair of transporting plates there are provided two engaging members 28 and 29 which preferably are formed by a single element fixedly connected to the transporting rod. In addition, a pair of additional engaging members 31, 33 are provided in the region of each of the opposite ends of the transporting rods 18, axially spaced a small distance from each other. These pairs of engaging members 31, 33 serve according to the present invention to transmit the transport plates to a respective one of the transfer means 24, 26 or to remove the plates from the respective transfer means.

Figure 6:
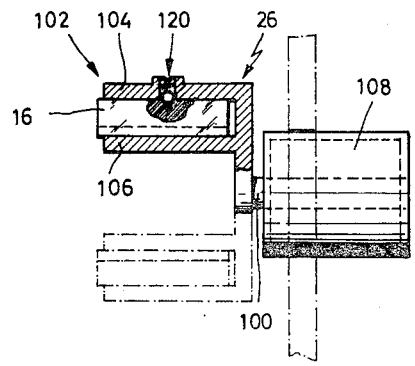
FIG. 6 is a section along the line 6—6 of FIG. 1, drawn to an enlarged scale and illustrating the transfer means according to the present invention.
Figure 7:
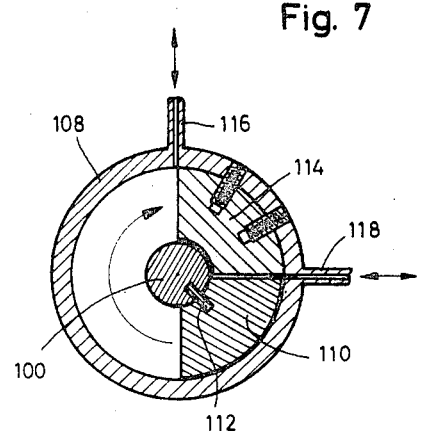
FIG. 7 is a cross section of the drive motor of the transfer means taken in a plane transverse to the axis of the latter, and drawn to a larger scale than FIG. 6.

The transfer means according to the present invention preferably comprise, as shown in FIGS. 6 and 7, gripping means 102 arranged for pivoting movement about the axis of a shaft 100 and comprising two gripping arms 104, 106 arranged spaced from and parallel to each other for a distance substantially equal to the width of the transporting plates. The shaft 100 which carries the gripping means 102 is, in an arrangement in which the movements of the transporting rod and the positioning rod are controlled by fluid operated devices, tilted about its axis also preferably by fluid operated cylinder and piston means 108 of known construction. The cylinder and piston means comprise, as shown in FIG. 7, a rotary piston 110 in form of a cylinder segment fixedly connected by means of a key or the like to the shaft 100 for rotation therewith in the cylindrical housing of the cylinder and piston means. A stop member 114 fixed by means of screws or the like in the interior of the housing limits the turning movement of the piston 110. Pressure fluid is fed through the conduits 116 and 118 into the interior of the housing, respectively discharged therefrom, so that the piston 110 and the gripping means 102 connected by means of the shaft 100 to the turntable piston are turned in the one or the opposite direction. The gripping arms 104 and 106 are arranged substantially normal to the direction of movement of the transporting plates so that the latter with the aid of the engaging members 31, 33 on the transporting rod may be moved into the space between the gripping arms 104 and 106 and be removed therefrom. Preferably, the gripping means 102 is provided with at least one yieldable arresting means 120 which may be in form of a spring pressed ball, as shown in FIG. 6, and engaging in a corresponding depression of the respective transporting plate 16.

Figure 8:
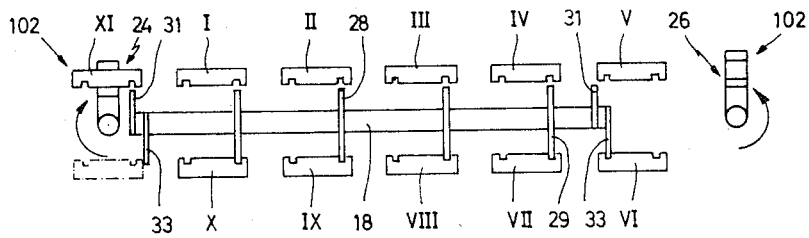
FIGS. 8–11 are schematic views illustrating the operation of the apparatus according to FIG. 1.
Figure 9:
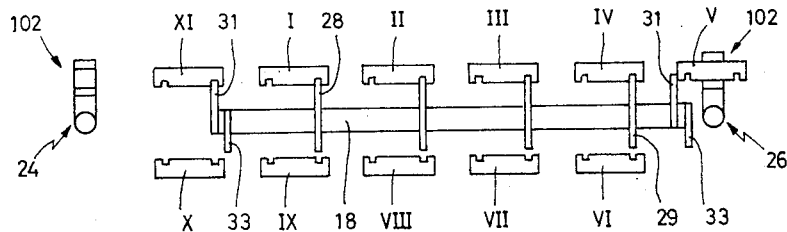
Figure 10:
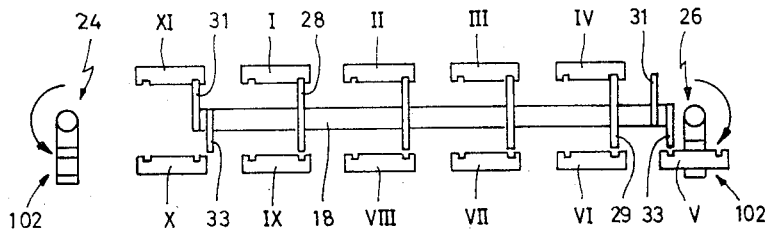
Figure 11:
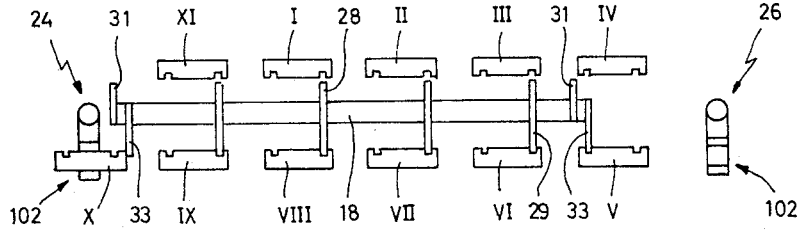

In the schematic FIGURES 8–11 it is assumed that the upper transporting plates are stepwise transported towards the right as viewed in these figures. The transporting rod 18 is shown in FIG. 8 in its end position which it will assume during return transport of the lower plates. The lower engaging member 33 at the left end, as viewed in FIG. 8, of the transporting rod has in this position transported the plate XI into its transfer position indicated in dash dotted lines in which the plate was received by the gripping means 102. During rest of the transporting plates, the gripping means 102 of the transfer mechanism 24 has been turned to its upper position as shown in FIG. 8 and moved thereby the plate XI to the position as shown in full lines in FIG. 8. In order to continue the transport of the plates, the transporting rod 18 is then turned about its axis in such a manner that the upper engaging members 28, respectively the engaging members 31 at the left end of the transporting rod are brought into positive engagement with the upper transporting plates I–V and XI, and after the engaging members are thus engaged with the respective plates, the rod 18 is moved toward the right to the position as shown in FIG. 9, whereby the plate XI is pulled out of the gripping means 102 of the transfer means 24, while at the opposite end of the rod the plate V is pushed, by means of the engaging member 31 at the right end of the rod 18, into the gripping means 102 of the transfer means 26. While the transporting rod 18 remains at rest for a short period, the transfer means 26 is turned about its axis so that the plate V received in the gripping means 102 thereof is moved to the position as shown in FIG. 10 in which the plate V is aligned in one plane with the lower plates VI–X. Subsequent thereto, the transporting rod 18 is turned so that the engaging members 29 respectively 33 are moved to their active position in engagement with the lower transporting plates and then the transporting rod 18 is moved in axial direction toward the left to the position as shown in FIG. 11. In this position the plate X is pushed into the gripping means of the transfer means 24 so that this plate may be moved in the manner as described above in connection with plate XI, whereafter the four mentioned cycles of movement are repeated.

The arrangement shown in FIGS. 19 and 20 is similar to the construction illustrated in FIGS. 1–5, that is this arrangement includes two pairs of superimposed guide means the upper one of which defines an assembly line 126. A plurality of operating units which are mechanically controlled are in this arrangement provided adjacent to at least some of the positions or working stations to which the plates are stepwisely moved, and preferably these working units are arranged on opposite sides of the assembly line 126 as indicated in dash-dot lines at 128 and 130 in FIG. 19. These operating units 128 and 130 are preferably cam controlled units, for instance assembly apparatus or small machine tools, the movable members of which are controlled in a known manner from cams. The cams for controlling the movement of the members of the operating units 128 and 136 are arranged respectively on a pair of shafts 132 and 134 mounted for rotation in the machine frame parallel to each other and to opposite sides of the guide means 126. Both shafts 132 and 134 are preferably driven from a common drive motor 131 in any convenient manner not illustrated in the drawings. The cams 136 for operating the members of the units 130 are fixed to the shaft 132, whereas the cams 138 for operating the members of the units 128 are fixed to the shaft 134, and these cams are connected by levers or transmission members carrying at the lower end thereof a cam follower engaging the cam faces of the respective cams to the movable members of the operating units 128 and 130 in a known manner as schematically illustrated in FIG. 20.

According to the present invention, the movements of the transporting rod 18 and the positioning rod 52 are also mechanically controlled by means of the aforementioned shafts 132, 134. In order to reciprocate the rod 18 in axial direction, a two armed lever 140 turnable about a fixed pivot axis 142 is provided which carries at opposite ends thereof rollers 144 and 146, respectively, and the roller 146 is engaged between two spaced guide members 148, 150 fixed spaced from each other to the rod 18 (FIGS. 21, 22), whereas the lower roller 144 constitutes a cam follower engaged in the cam groove 152 of the cam 154 fixed to the shaft 132 for rotation therewith. The cam groove 152 is arranged on the periphery of the cam 154 in such a manner that during rotation of the shaft 132 about its axis, the lever is tilted between the positions as indicated by the dash-dot center lines of FIG. 21 whereby the rod 18 is reciprocated in axial direction.

Figure 21:
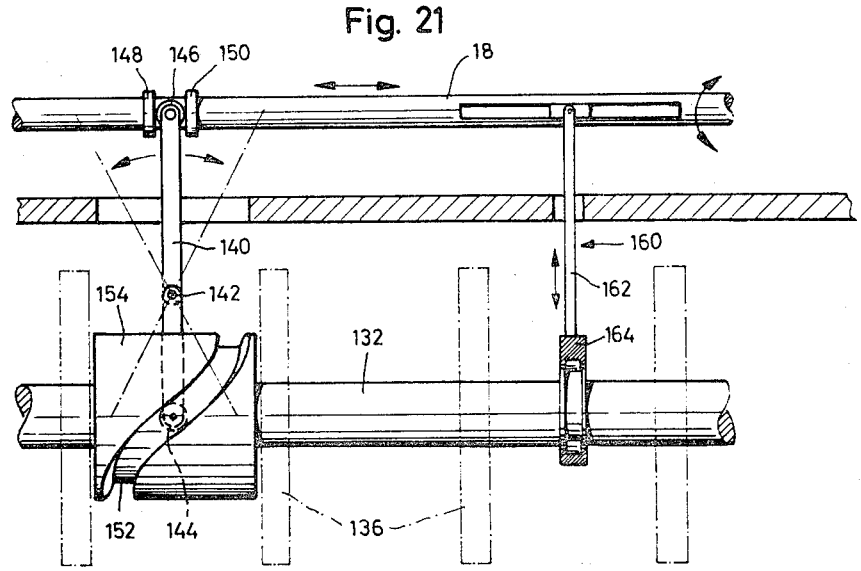
FIG. 21 is a partially sectioned side view illustrating the control mechanism for the transporting rod of the arrangement according to FIGS. 19 and 20 and drawn to an enlarged scale.

In order to tilt the transporting rod 18 about its axis to bring the engaging members fixed thereto alternately in engagement with the plates on the upper and on the lower guide means, means 160 as schematically shown in FIG. 21 are provided, which include a control lever 162 cooperating with the peripheral cam face of a disc-shaped cam 164 which is mounted on the shaft 132 for rotation therewith. The lever 162 is spring pressed in a manner not shown in the drawing to maintain a cam follower at the lower end thereof in engagement with the peripheral cam face of the cam 164 and the upper end of the lever 162 is connected to a slide member maintained in a groove extending in longitudinal direction of the rod 18 so that the latter may be turned by the mechanism 160 in the manner as described above in both axial end positions of the rod.

Figure 22:
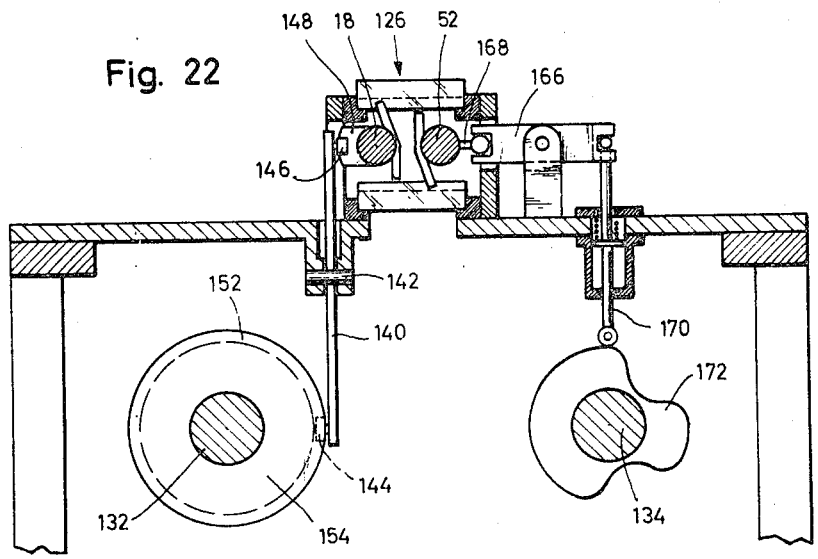
FIG. 22 is a cross section taken along the line 22—22 of FIG. 19 and drawn to an enlarged scale.

The mechanism 160 for turning the rod 18 may also be similar to the mechanism for turning the positioning rod 52, which mechanism includes as clearly shown in FIG. 22 a two-armed lever 166 mounted for tilting movement on a bracket of the support and having forked ends respectively engaging the free end of the tilting rod 168 fixed at its other end to the positioning rod 52 projecting in radial direction therefrom, and the upper end of a vertically guided control rod 170 the lower end of which carries a roller maintained in engagement with the peripheral cam face of a disc-shaped cam 172 by means of a spring sandwiched between a collar on the rod 170 and an abutment member on the support as shown in FIG. 22. The cam 172 is fixed to the shaft 134 for rotation therewith.

Figure 23:
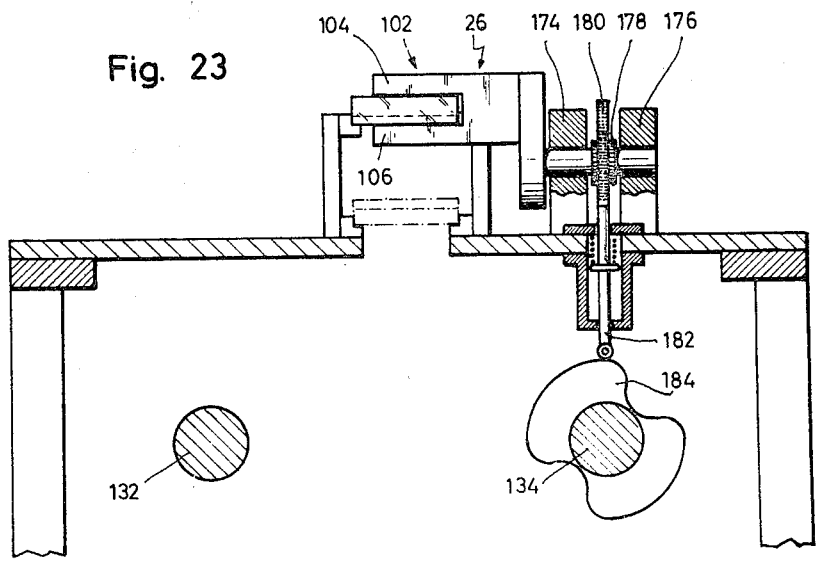
FIG. 23 is a cross section taken along the line 23—23 of FIG. 19 and likewise drawn to an enlarged scale.

The transfer means 24 and 26 respectively arranged at the opposite ends of the assembly line, as shown in FIG. 19 are in this case likewise mechanically controlled in the manner as best shown in FIG. 23 for the transfer means 26. For this purpose, the turnable shaft 100 of the gripping means 102 is mounted in a pair of spaced bearings 174, 176 fixed to and projecting upwardly from the machine frame, and a pinion 178 is fixed between the bearings to the shaft 100 and cooperates with a rack 180 integrally formed with a control rod 182 guided for movement in vertical direction in the manner as shown in FIG. 23 and carrying at its lower end a roller maintained by the spring arrangement illustrated in FIG. 23 in engagement with the peripheral cam face of a disc-shaped cam 184 fixed to the shaft 134 for rotation therewith.

It will be understood that each of the elements described above, or two or more together, may also find a useful application in other types of conveying apparatus for stepwise moving elements between and exactly locating the elements in a plurality of positions differing from the types described above.

While the invention has been illustrated and described as embodied in a conveying apparatus of the aforementioned type which includes a turnable positioning rod provided with locating members movable during turning of the rod between an active position in which the positioning members engage plates transported by the conveying apparatus to maintain the plates for a given time period in a fixed position, and an inactive position in which the positioning members are disengaged from the plates and freeing the same for movement by the transporting means of the conveying apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A conveying apparatus for stepwise moving elements between and exactly locating the elements in a plurality of positions comprising, in combination, support means; at least one pair of spaced oppositely arranged guide means each having opposite ends and being fixedly carried by said support means, at least one of said pair of guide means defining an assembly line; a plurality of spaced transporting plates slidably guided by said guide means for movement therealong; elongated transporting means extending along said guide means and having a plurality of engaging members respectively adapted to engage said transporting plates, said transporting means being mounted on said support means movable in longitudinal direction and movable between an active position in which said engaging members respectively engage said plates and an inactive position in which said engaging members are out of engagement with said plates; moving means cooperating with said elongated transporting means for cyclically moving the latter between said active and said inactive positions; reciprocating means cooperating with said elongated transporting means for reciprocating the latter in longitudinal direction for a given distance in sequence with said moving means so that during movement of the transporting means in one direction of reciprocation while said transporting means is in said active position, said transporting plates will be moved through said given distance in said one direction; elongated positioning means extending along the assembly line and including a plurality of locating means, at least one for each plate on said assembly line, said positioning means being mounted on said support means immovably in longitudinal direction and movable between an active position in which said locating means respectively engage said plate members for maintaining the same in the position to which they are moved by said transporting means and an inactive position disengaged from said plates; and means cooperating with said positioning means for moving the latter between said positions thereof.

2. A conveying apparatus as defined in claim 1, wherein said elongated transporting means comprises an elongated transporting rod mounted on said transport means for reciprocation in longitudinal direction and turnably about its axis, wherein each of said engaging members is fixed to said rod projecting therefrom in direction transverse to the rod axis, and wherein each of said plates is provided with an engaging portion to be engaged by the free end of the respective engaging member when said transporting means is in said active position.

3. A conveying apparatus as defined in claim 2, wherein each of said locating means on said positioning means comprises a pair of locating members spaced in direction of the elongation of said elongated positioning means from each other and adapted to cooperate in said active position with correspondingly spaced surfaces on the respective plate.

4. A conveying apparatus as defined in claim 3, wherein said locating members of each pair of locating members are spaced from each other a distance equal to the length of each plate so as to engage in said active position end faces of the respective plate extending transverse to the direction of movement thereof.

5. A conveying apparatus as defined in claim 3, wherein said positioning means comprises an elongated positioning rod mounted on said support means turnably about its axis but immovably in axial direction, said locating members being fixed to said positioning rod projecting therefrom transverse to the axis of the latter, said rods being arranged substantially parallel to each other and in a plane substantially parallel to said guide means.

6. A conveying apparatus as defined in claim 2, wherein said opposite ends of one guide means are arranged adjacent corresponding ends of the other guide means, and including transfer means for transferring a plate at one end of one guide means to the adjacent end of the other guide means.

7. A conveying apparatus as defined in claim 6, wherein said transfer means comprises gripping means movable between a pair of end positions in one of which said gripping means is adapted to grip a plate at said one end of said one guide means and in the other of which said gripping means introduces said plate into the adjacent end of the other guide means in a position to be engaged by a corresponding engaging member of said transporting rod, and means cooperating with said gripping means for moving the latter between said positions thereof.

8. A conveying apparatus as defined in claim 7, wherein said gripping means comprises a pair of arms extending substantially parallel to and spaced from each other a distance substantially equal to the thickness of said plates so as to be adapted to engage a plate at opposite faces thereof, said arms being mounted turnably about an axis substantially normal to the direction of movement of said plates between said two end positions, and yieldable arresting means adapted to engage the plate received between the arms for releasably holding the plate therebetween.

9. A conveying apparatus as defined in claim 1, including at least two assembly lines, the guide means of which are arranged in a common plane and substantially parallel to each other.

10. A conveying apparatus as defined in claim 1 and including at least two assembly lines, the guide means of which are arranged in substantially parallel planes adjacent each other.

11. A conveying apparatus as defined in claim 1, wherein each of said guide means includes a pair of substantially parallel guide members arranged in a substantially horizontal plane.

12. A conveying apparatus as defined in claim 1, wherein each of said guide means includes a pair of substantially parallel guide members arranged in a substantially vertical plane.

13. A conveying apparatus as defined in claim 5, wherein said pair of guide means are arranged in parallel and adjacent planes, and wherein a single transporting rod and a single positioning rod are located between said planes.

14. A conveying apparatus as defined in claim 13, wherein said engaging members project to opposite sides of the transporting rod and said locating members also project to opposite sides of the locating rod, and wherein said rods are turned about their axes in such a manner that when the engaging members are in engagement with the plates on one of said pair of guide means, the locating members are in engagement with the plates on the other of said pair of guide means.

15. A conveying apparatus as defined in claim 5, and including a plurality of operating units arranged on opposite sides of said assembly line at least some of said positions to which said plates are stepwise transported, a pair of shafts mounted on said support means turnably about axes substantially parallel to said assembly line and respectively at opposite sides of the latter, drive means for rotating said shafts simultaneously about their axes, a plurality of cams fixedly mounted on said shafts for rotation therewith, transmission means between said cams and operating members of said operating units for moving said members during rotation of said cams in a predetermined sequence, additional cams on at least one of said shafts, and transmission means between said additional cams and said rods for reciprocating said transporting rod in longitudinal direction and for turning both rods about their axes in sequence to the movement performed by said operating members.

References Cited
UNITED STATES PATENTS
3,301,374    1/1967    Proctor _____ 198—19

EVON C. BLUNK, Primary Examiner

DOUGLAS WATTS, Assistant Examiner

U.S. Cl. X.R.

104—147; 198—135, 221